Patented Mar. 12, 1940

2,193,559

UNITED STATES PATENT OFFICE 2,193,559

PRODUCTION OF RUTILE PIGMENTS

John L. Keats, Wilmington, Del., assignor to E. I. du Pont de Nemours & Company, Wilmington, Del., a corporation of Delaware No Drawing. Application March 10, 1939, Serial No. 260,915

11 Claims. (Cl. 23—202)

This invention relates to an improved process for producing titanium pigments. More particularly it relates to a process for producing titanium dioxide pigments in the rutile crystal form. Still more particularly it relates to a cyclic process for producing rutile pigment from anatase titanium dioxide.

A number of processes involving the precipitation of rutile titanium dioxide from titanium salt solutions are known in the art. One such process is disclosed in U. S. Patent 2,062,133 and the product produced therefrom is very good in certain respects. However, there are a number of disadvantages present in the operation which has made this process relatively uneconomical. For example, this process requires the production of chemically pure titanium tetrachloride. This chemical has not been made satisfactorily on a commercial scale and therefore its cost of manufacture has been regarded as too high to be of interest to pigment manufacturers. Furthermore, since the titanium chloride solution hydrolyzes thereby producing hydrochloric acid, a corrosion problem is encountered in its handling. This hydrochloric acid is unusable in the process without conversion to chlorine and when such conversion is practiced large losses are encountered making it necessary to purchase large quantities of chlorine.

Titanium dioxide pigments are now produced in large quantities by processes involving sulfate solutions. The resulting pigments exhibit the anatase crystal pattern and have found large sales due to their high hiding power. Since the hiding power of a pigment is dependent on the refractive index of the particles and since anatase has a refractive index of 2.52 and rutile has a refractive index of 2.71, it follows that rutile has a higher hiding power than anatase. In spite of this hiding power advantage of rutile pigment such products have not been marketed to any great extent due to their high production cost. As indicated above, the prior art process consumes chlorine which product is relatively expensive. Furthermore, the dilute hydrochloric acid which is recovered is as a general rule unsalable in large quantities except at prices competitive with sulfuric acid. This makes the raw material too expensive to be attractive to pigment producers.

This invention has as an object a cyclic process for the production of rutile pigment. A further object is the production of a rutile precipitate from a titanium nitrate solution by a cyclic process. A still further object is the production of rutile precipitated titanium dioxide from anatase. Additional objects will become apparent from a consideration of the following description and claims.

These objects are attained according to the herein described invention which broadly comprises digesting a titanium material with barium hydrate and thereafter treating the resulting barium titanate with nitric acid, thereby converting the compound to barium nitrate and titanium nitrate. The barium nitrate is separated from the titanium nitrate and is then hydrolyzed to produce a rutile precipitate. The barium nitrate crystals are then treated, as described herein, and reused in the above process.

In a more restricted sense this invention comprises taking a mixture of a titanium oxide containing material and barium hydrate and heating said mixture. The resulting barium titanate is then treated with nitric acid, said acid having a concentration between about 20% and about 60%. The ratio of acid to barium titanate in the decomposition step may vary from between about 3 mols and about 10 mols of nitric acid per mol of barium titanate. The resulting barium nitrate is then separated from the resulting titanium nitrate and said titanium nitrate is hydrolyzed, thereby producing a rutile precipitate. I have found it desirable to have the concentration of the titanium solution in the aforementioned hydrolysis step in excess of about 50 grams of titanium dioxide per liter. The recovered barium nitrate crystals are thereafter treated, as described herein, and reused in the above process.

The preferred embodiment of this invention comprises taking a mixture comprising equivalent amounts of anatase titanium dioxide and barium hydrate and digesting this mixture at about the boiling point of the solution for about one hour, thereby producing barium titanate. The barium titanate is then treated with nitric acid, said acid having a concentration between about 30% and about 50%. I prefer to have the ratio of acid to barium titanate in the decomposition step between about 5 mols and about 10 mols of nitric acid per mol of barium titanate. Barium nitrate and titanium nitrate are thereby formed, the greater amount of barium being present as barium nitrate crystals and, as such, is readily separated from the titanium nitrate which is in solution. The titanium nitrate is then hydrolyzed to produce a rutile precipitate in a nitric acid solution containing small amounts of barium nitrate and smaller amounts of unhydrolyzed titanium nitrate. I prefer to have the concentration of the titanium solution in the aforementioned hydrolysis step between about 80 and about 120 grams of titanium dioxide per liter. The rutile precipitate is then separated from the nitric acid solution by methods familiar to one skilled in the art.

The nitric acid solution is reused in the above described process and the soluble nitrate salts are maintained in the system thereby avoiding any substantial losses. The barium nitrate crystals, referred to above, are decomposed by heat treatment, thereby yielding oxides of nitrogen and oxides of barium, both of which are recovered and reused in this process. The oxides of nitrogen are passed through a nitric acid recovery system and recovered as nitric acid by operations well-known in the art. This acid, along with that resulting from the hydrolysis of the titanium nitrate solution, is reusable in my process and only the losses encountered in carrying out this operation have to be replaced by fresh acid. The barium oxide, obtained according to my process, is added to water in order to regenerate barium hydroxide. This barium hydroxide is then used to produce additional barium titanate for the continuation of this cyclic process. Since the nitric acid and barium hydroxide reactants are regenerated and reused in this process, practically no expenditure for these materials is required.

The titanium material employed herein may be readily obtained as a precipitate from the hydrolysis of titanium sulfate solution. In the preparation of this material for my described process, titanium sulfate is hydrolyzed by processes well-known in the art, thereby producing an anatase product. This anatase product is then thoroughly washed substantially free of iron compounds and substantially free of soluble sulfuric acid. The adsorbed sulfuric acid is then neutralized and the resulting sulfate removed by washing. In this neutralization step I prefer to use reagents which yield a soluble sulfate such as, for example, sodium carbonate, sodium hydroxide, or ammonium hydroxide, although it is to be understood that other alkaline materials, such as potassium carbonate, ammonium carbonate, sodium bicarbonate, potassium bicarbonate, and the like, may be used. It is desirable that the sulfuric acid be substantially removed from the anatase product because otherwise the rutile pigment would contain amounts of barium sulfate as high as 10 or more per cent. Still further, all of the barium hydroxide would not be recovered in the process.

The hydrolysis step employed in this process may be conducted in accordance with the seeding process disclosed in U. S. Patent No. 2,062,133. In this operation I prefer to employ barium hydrate as the precipitant for the seed material since by its use it is unnecessary to use any additional chemicals. The barium hydrate is added or admixed with the nitrate solution. It is to be understood, however, that other bases can be employed for precipitating this titanium oxygen compound. However, as stated herein, additional expense plus the contamination of the solution results. The aging or conditioning of the seeds is suitably carried out in accordance with the teaching in the aforementioned patent. Other methods of conducting the hydrolysis may be employed but regardless of the method, care must be taken to maintain the titanium oxide content of the hydrolysis solution in excess of 40 grams of titanium dioxide per liter. The reason for this requirement is to avoid the expense of working large volumes and also, to avoid the precipitation of titanium oxide in the anatase crystal form. At the higher concentrations the hydrolysate gives the rutile pattern when tested by X-ray methods and the pigment produced possesses satisfactory properties in respect to color and particle size. On the other hand, when the hydrolysis is conducted at concentrations below about 40 grams of titanium dioxide per liter, the hydrolysis product is wholly or partially anatase—a result which is to be avoided.

It is obvious to those skilled in the art that the titanium concentration of the nitrate solution will depend on the dissolving conditions and when using a dry barium titanate product and relatively strong nitric acid solution the titanium nitrate solution may contain as much as 160 or more grams of $TiO_2$ per liter. In practice this is decreased somewhat by washing of the barium nitrate crystals with cold water, barium nitrate solutions, or aqueous nitric acid. The more dilute portion of these washings may be used for the preparation of the seed material for the hydrolysis by treatment with barium hydrate. The resulting barium nitrate supernatent liquor, after separation from the titanium seed material, can again be used as wash water to displace the titanium nitrate solution for more barium nitrate crystals.

The main reactions of this process can be expressed in the following equations:

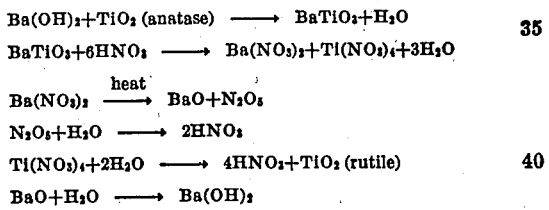

By simple addition of these equations with cancellation of all items appearing on both sides of the resulting equation we arrive at a simple equation expressed as follows:

This invention may be more readily understood by a consideration of the following example which example is given for illustrative purposes and is not intended to place any restrictions or limitations upon the herein described invention.

*Example*

A washed iron-free hydrolysate from a hydrolysis of titanium sulfate solution was slurried in water and neutralized with ammonium hydroxide. The ammonium sulfate thus produced was removed by washing with water and to the sulfate free titanium oxide suspension a chemically equivalent amount of barium hydroxide as a solution was added. The mixture was heated to the boiling point and so maintained for one hour during which time the two reactants formed barium titanate. The slurry was dewatered by filtration and the cake treated with cold 50% nitric acid. Within several hours the agitated mixture or suspension lost its opaqueness and then consisted of crystals of barium nitrate in a titanium nitrate solution. Upon filtration about 80% of the titanium solution was recovered without the aid of wash water and the remainder was obtained by washing with cold acidified and saturated barium nitrate solution. The solution and the wash waters were mixed giving a solution running about 80 grams of TiO₂ per liter. This was hydrolyzed upon addition of a seed material by the process referred to above and gave a product showing the rutile crystal pattern when tested by X-ray methods. The barium nitrate crystals were decomposed by heat giving oxides of nitrogen which were recovered along with the hydrolysis acid for reuse in the process. The barium oxide produced was converted to barium hydroxide and reused in accordance with the described process.

It is to be understood that the specific embodiments of my invention may be subjected to variation and modification without departing from the scope thereof. For instance, while I prefer to use a hydrolysate from titanium sulfate solutions as the source of the TiO₂, my process is not limited thereto. I may use other titanium oxide containing materials well-known in the art, either before or after they have been calcined. However, it is highly desirable to use a product of high purity as regards color imparting materials in order to avoid the possibility of contamination of the final pigment.

Although I prefer to employ equivalent amounts of the titanium material and barium hydrate, it is to be understood that the digestion step may be carried out using smaller or larger than equivalents of barium hydrate. If a larger than equivalent amount of barium hydrate is employed, the excess barium hydrate remains in the suspension and unless removed by filtration and thereby lost, it will be converted to barium nitrate upon the treatment of the barium titanate with nitric acid. It therefore follows that the most economical operation comprises using substantially equivalent amounts of the two reactants.

Although I prefer to digest the mixture of the titanium material and barium hydrate at about the boiling point of the solution for about one hour, it is understood that both the temperature and heating period may be varied without departing from the scope of this invention. For example, a lower temperature may be employed in which case a longer heating time will be necessary. On the other hand, temperature higher than 100° C. may be employed, in which case a shorter heating period than one hour will be sufficient. It is, therefore, seen that there is an inverse relationship between these two factors and they may be varied accordingly.

As stated herein, I prefer to employ nitric acid having a concentration between about 30% and about 50%, although it is to be understood that concentrations outside of this range may be employed without sacrificing the beneficial results derived in practicing the herein described process. Thus, a concentration of less than about 10% or higher than about 70% may be employed although the recovery of barium nitrate as crystals is not realized to its fullest extent unless a nitric acid concentration of about 30% to about 50% is used.

Although the ratio of nitric acid to barium titanate in the acid decomposition step is preferably between about 5 mols and about 10 mols of nitric acid per mol of barium titanate it is to be understood that larger or smaller amounts of nitric acid and/or barium titanate may be employed. However, the best results are obtained by operating with the aforementioned preferred ratio and said ratio is therefore recommended.

My process is also useful in the preparation of extended rutile pigments. For instance, the barium nitrate can be converted to barium sulfate and nitric acid by treatment with sulfuric acid. By making this treatment in the presence of the titanium nitrate solution and subsequently hydrolyzing, the rutile pigment is precipitated upon the barium sulfate and a product of the extended type results. Furthermore, the titanium dioxide content of this extended pigment can be varied over a wide range by increasing or decreasing the extender components.

The advantages of this novel process are numerous. It allows the use of the sulfate process for the preparation of a relatively pure titanium oxide material. It is unnecessary to practice many of the refinements which have been made in said sulfate process since the sulfate hydrolysate is not to be used as a pigment but is of interest only as a source of pure titanium oxide. This portion of the process is very flexible and a very simple sulfate operation is desired for obvious economical reasons.

The process also avoids the use of chloride solutions and the corrosion problems encountered in hydrochloric acid processes. Nitric acid is not nearly so corrosive and the plant design is therefore simpler and more economical. This acid is also inexpensive and the synthetic product is widely available.

Additionally, the cyclic character of the process and the possibility of high recovery of the reactants makes the process highly attractive. The barium hydroxide is easily recovered as barium nitrate and is subsequently converted to barium oxide and barium hydroxide by well-known operations. The nitric acid is also readily recovered and very little make up chemicals are necessary in a plant of commercial size. It therefore follows that my novel process allows one to convert an anatase precipitate into a rutile precipitate without waste of large amounts of raw materials and by a relatively simple cyclical process.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A cyclic process for producing a rutile pigment which comprises digesting a titanium oxide containing material with barium hydrate, adding nitric acid to the resulting barium titanate thereby forming barium nitrate and titanium nitrate, separating the barium nitrate from the titanium nitrate solution, hydrolyzing the titanium nitrate and separating the rutile precipitate from the acid solution, decomposing the aforementioned separated barium nitrate to produce oxides of nitrogen and barium and thereafter employing said oxides to produce nitric acid and barium hydroxide for reuse in the aforementioned process.

2. A cyclic process for producing a rutile pigment which comprises digesting a titanium oxide containing material with barium hydrate, adding nitric acid having a concentration between about 20% and about 60%, to the resulting barium titanate thereby forming barium nitrate and titanium nitrate, separating the barium nitrate from the titanium nitrate solution, hydrolyzing the titanium nitrate and separating the rutile precipitate from the acid solution, decomposing the aforementioned separated barium nitrate to produce oxides of nitrogen and barium and thereafter employing said oxides to produce nitric acid and barium hydroxide for reuse in the aforementioned process.

3. A cyclic process for producing a rutile pigment which comprises digesting a titanium oxide containing material with barium hydrate, adding nitric acid having a concentration between about 20% and about 60% to the resulting barium titanate, the ratio of acid to barium titanate being between about 3 mols and about 10 mols of nitric acid per mol of barium titanate, thereby forming barium nitrate and titanium nitrate, separating the barium nitrate from the titanium nitrate solution, hydrolyzing the titanium nitrate and separating the rutile precipitate from the acid solution, decomposing the aforementioned separated barium nitrate to produce oxides of nitrogen and barium and thereafter employing said oxides to produce nitric acid and barium hydroxide for reuse in the aforementioned process.

4. A cyclic process for producing a rutile pigment which comprises digesting a titanium oxide containing material with barium hydrate, adding nitric acid having a concentration between about 20% and about 60% to the resulting barium titanate, the ratio of acid to barium titanate being between about 3 mols and about 10 mols of nitric acid per mol of barium titanate, thereby forming barium nitrate and titanium nitrate, separating the barium nitrate from the titanium nitrate solution, hydrolyzing the titanium nitrate, the titanium dioxide concentration therein being between about 50 and 160 grams per liter, and separating the rutile precipitate from the acid solution, decomposing the aforementioned separated barium nitrate to produce oxides of nitrogen and barium and thereafter employing said oxides to produce nitric acid and barium hydroxide for reuse in the aforementioned process.

5. A cyclic process for producing a rutile pigment which comprises digesting an equivalent amount of a titanium oxide containing material with an equivalent amount of barium hydrate, adding nitric acid having a concentration between about 20% and about 60% to the resulting barium titanate, the ratio of acid to barium titanate being between about 3 mols and about 10 mols of nitric acid per mol of barium titanate, thereby forming barium nitrate and titanium nitrate, separating the barium nitrate from the titanium nitrate solution, hydrolyzing the titanium nitrate, the titanium dioxide concentration therein being between about 50 and 160 grams per liter, and separating the rutile precipitate from the acid solution, decomposing the aforementioned separated barium nitrate to produce oxides of nitrogen and barium and thereafter employing said oxides to produce nitric acid and barium hydroxide for reuse in the aforementioned process.

6. A cyclic process for producing a rutile pigment which comprises digesting an equivalent amount of anatase titanium dioxide with an equivalent amount of barium hydrate, adding nitric acid having a concentration between about 20% and about 60% to the resulting barium titanate, the ratio of acid to barium titanate being between about 3 mols and about 10 mols of nitric acid per mol of barium titanate, thereby forming barium nitrate and titanium nitrate, separating the barium nitrate from the titanium nitrate solution, hydrolyzing the titanium nitrate, the titanium dioxide concentration therein being between about 50 and 160 grams per liter, and separating the rutile precipitate from the acid solution, decomposing the aforementioned separated barium nitrate to produce oxides of nitrogen and barium and thereafter employing said oxides to produce nitric acid and barium hydroxide for reuse in the aforementioned process.

7. A cyclic process for producing a rutile pigment which comprises digesting anatase titanium dioxide with barium hydrate, adding nitric acid having a concentration between about 30% and about 50% to the resulting barium titanate, the ratio of the acid to the barium titanate being between about 3 mols and about 10 mols of nitric acid per mol of barium titanate, separating the barium nitrate from the titanium nitrate solution, hydrolyzing the titanium nitrate and separating the rutile precipitate from the acid solution, decomposing the aforementioned separated barium nitrate to produce oxides of nitrogen and barium and thereafter employing said oxides to produce nitric acid and barium hydroxide for reuse in the aforementioned process.

8. A cyclic process for producing a rutile pigment which comprises taking a mixture comprising an equivalent amount of anatase titanium dioxide and an equivalent amount of barium hydrate and digesting the mixture at about the boiling point of the solution for about 1 hour, adding nitric acid having a concentration between about 30% and about 50% to the resulting barium titanate, the ratio of the acid to barium titanate being between about 5 mols and about 10 mols of nitric acid per mol of barium titanate, thereby producing barium nitrate and titanium nitrate, separating the barium nitrate from the titanium nitrate solution, hydrolyzing the titanium nitrate, the concentration of the titanium solution being between about 80 grams and about 120 grams of titanium dioxide per liter, thereby producing a rutile precipitate, separating the rutile precipitate from the acid solution, decomposing the aforementioned separated barium nitrate to produce oxides of nitrogen and barium and thereafter employing said oxides to produce nitric acid and barium hydroxide for reuse in the aforementioned process.

9. A cyclic process for producing a rutile pigment which comprises digesting a titanium oxide containing material with barium hydrate, adding nitric acid to the resulting barium titanate thereby forming barium nitrate and titanium nitrate, separating the barium nitrate from the titanium nitrate solution, hydrolyzing the titanium nitrate, the titanium dioxide concentration therein being between about 50 and 160 grams per liter, separating the rutile precipitate from the acid solution, decomposing the aforementioned separated barium nitrate to produce oxides of nitrogen and barium and thereafter employing said oxides to produce nitric acid and barium hydroxide for reuse in the aforementioned process.

10. A cyclic process for producing a rutile pigment which comprises digesting a titanium oxide containing material with barium hydrate, adding nitric acid having a concentration between about 20% and about 60%, to the resulting barium titanate thereby forming barium nitrate and titanium nitrate, separating the barium nitrate from the titanium nitrate solution, hydrolyzing the titanium nitrate, the titanium dioxide concentration therein being between about 50 and 160 grams per liter, separating the rutile precipitate from the acid solution, decomposing the aforementioned separated barium nitrate to produce oxides of nitrogen and barium and thereafter employing said oxides to produce nitric acid and barium hydroxide for reuse in the aforementioned process.

11. A cyclic process for producing a rutile pigment which comprises digesting anatase titanium dioxide with barium hydrate, adding nitric acid having a concentration between about 30% and about 50% to the resulting barium titanate, the ratio of the acid to the barium titanate being between about 3 mols and about 10 mols of nitric acid per mol of barium titanate, separating the barium nitrate from the titanium nitrate solution, hydrolyzing the titanium nitrate, the titanium dioxide concentration therein being between about 80 and about 120 grams per liter, separating the rutile precipitate from the acid solution, decomposing the aforementioned separated barium nitrate to produce oxides of nitrogen and barium and thereafter employing said oxides to produce nitric acid and barium hydroxide for reuse in the aforementioned process.

JOHN L. KEATS.